US007639257B2

(12) United States Patent
Renner (10) Patent No.: US 7,639,257 B2
(45) Date of Patent: Dec. 29, 2009

(54) GLYPHLETS

(75) Inventor: John S. Renner, Atherton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 455 days.

(21) Appl. No.: 10/210,512

(22) Filed: Jul. 31, 2002

(65) Prior Publication Data

US 2004/0025118 A1 Feb. 5, 2004

(51) Int. Cl.
*G06T 11/00* (2006.01)
(52) U.S. Cl. .................................. 345/467; 715/269
(58) Field of Classification Search ................ 345/467, 345/471, 472.3; 358/1.11; 715/542, 269
See application file for complete search history.

(56) References Cited

U.S. PATENT DOCUMENTS

| 5,500,931 | A | * | 3/1996 | Sonnenschein | ............. | 345/467 |
| 5,748,975 | A | * | 5/1998 | Van De Vanter | ............. | 715/531 |
| 5,877,776 | A | * | 3/1999 | Beaman et al. | ............. | 715/542 |
| 5,926,189 | A | * | 7/1999 | Beaman et al. | ............. | 345/467 |
| 6,678,410 | B1 | * | 1/2004 | Phinney et al. | ............. | 345/471 |
| 6,760,029 | B1 | * | 7/2004 | Phinney et al. | ............. | 345/471 |
| 6,952,210 | B1 | * | 10/2005 | Renner et al. | ............. | 345/471 |
| 2004/0205677 | A1 | * | 10/2004 | Hughes et al. | ............. | 715/542 |

FOREIGN PATENT DOCUMENTS

JP 2000-311160 11/2000

OTHER PUBLICATIONS

Yannis Haralambous and John Plaice, The Design and Use of a Multiple-Alphabet Font with Ω, 1998, Proc. Seventh Int'l Conf. Electronic Publishing (EP'98), 1998, pp. 27-37.*
IBM Technical Disclousre Bulletin, New Simple GAIJI Recording Method without CMap Modification, Nov. 1, 1998, vol. 41, issue 415.*
IBM Technical Disclousre Bulletin, Gaiji Processing Mechanism Using Yomi, May 1, 1984, vol. 26, issue 12, pp. 6301-6302.*
Anonymous: "Picture Reference Exchange by XML", Japanese Standards Association, "Online!", No. TRX 0047, Apr. 21, 2001, http://web.archive.org/web/20010421170444/http://www.y-adagio.com/public/standards/tr lsi xml/lsi xml.html , 9 pages.
Anonymous: "Picture Reference Exchange by XML", Japanese Standards Association, "Online'", No. TRX 0047, Apr. 21, 2001, http://web.archive.org/web/20010421170444/http://www.y-adagio.com/public/standards/tr_lsi_xml/lsi_xml.html , 5 pages.

(Continued)

*Primary Examiner*—Jeffery A Brier
(74) *Attorney, Agent, or Firm*—Fish & Richardson P.C.

(57) ABSTRACT

Methods and apparatus, including computer program products, implementing and using techniques for processing and constructing an electronic text document. An electronic document is provided that includes a string having one or more references. The string is parsed to identify a reference. A glyphlet is identified based on the identified reference. The glyphlet includes a set of character attributes defining semantic information of a character and a set of glyph attributes defining appearance information for a representation of the character. One or more character attributes or glyph attributes for the identified glyphlet are used to process text in the electronic document.

72 Claims, 2 Drawing Sheets

OTHER PUBLICATIONS

Murata, et al. "Embedding Glyph Identifiers in XML Documents", Japanese Standards Association, "Online!", Dec. 20, 2002, http://www.w3.org/TR/2002/NOTE-EGIX-20021220/, 5 pages.

Jelliffe, "Elements for Non-Unicode Characters in XML", Academia Sinica, "Online!", Jun. 8, 1999, http://www.sinica.edu.tw/{ricko.xcs/missing_chars.html, 4 pages.

Anonymous, "Text: Alternative Glyphs", W3C Recommendation SVG 1.0, "Online!", Sep. 4, 2001, http://www.web.archive.org/web/20011031185542/http://www.w3.org/TR/SVG/text.html, 5 pages.

DeLaHunt, "Gaiji: Characters, Glyphs, Both, or Neither", 22$^{nd}$ International Unicode Conference, "Online!", Sep. 9, 2002, http://partners.adobe.com/asn/developer/type/pdfs/Gaiji_DeLaHunt_IUC22.pdf, 30 pages.

DeLaHunt, Adobe's New Gaiji Architecture, 26$^{th}$ Internationalization and Unicode Conference, "Online!", Sep. 7, 2004, http://partners.adobe.com/asn/developer/type/pdfs/SING_Intro_IUC26.pdf, 28 pages.

Adobe Systems Incorporated, "PostScript®, Language Reference," Third Edition, Chapter 5, pp. 313-390, Addison-Wesley Publishing Company, ISBN 0-201-37922-8, Feb. 1999.

Christian Wittern and Urs App, "The IRIZ KanjiBase," http://www.gwdg.de/~cwitter/kanjibas/cefintro.htm, pp. 1-4, Jan. 21, 1995.

Adobe Systems Incorporated, "The Type 42 Font Format Specification," Technical Note #5012, published by Adobe Systems Incorporated, pp. 1-24, Jul. 31, 1998.

Apple Computers, "Apple Advanced Typography Font Tables," http://developer.apple.com/fontsTTRefMan/RM06/Chap6Tables.html, pp. 1-9, Sep. 30, 1996.

Apple Computers, "The TrueType Font File," http://developer.apple.com/fonts/TTRefMan/RM06/Chap6.html, pp. 1-7, Oct. 27, 2000.

Apple Computers, "The 'Zapf' Table," http://developer.apple.com/fonts/TTRefMan/RM06/Chap6Zapf.html, pp. 1-17, Sep. 14, 2000.

Hamagishi, Japanese Patent Office, "Translation of office action dated Sep. 30, 2008 issued in corresponding Japanese application No. 2004-524276", 3 pages.

* cited by examiner

GLYPHLETS

BACKGROUND OF INVENTION

This invention relates to providing glyphs in a text document.

A character is the smallest component of written language having semantic value. A character refers to an abstract meaning and/or shape, rather than a specific shape. A glyph is a representation of a character. A glyph image is the actual concrete image of a glyph representation having been rasterized or otherwise imaged onto some display surface.

An encoded character is a character that is associated with an encoding value, for example, a scalar value included in a character set standard such as ASCII (American Standard Code for Information Interchange) or Unicode. An encoding value maps to a set of character attributes defining semantic information of the character. Character set standards are defined by standards organizations: for example, the ASCII standard is defined by ANSI, and the ISO Standard 8859 is defined by ISO (International Standards Organization). Character set standards are generally revised from time to time. Typically, when a character set standard is defined, the encoding values are simultaneously defined.

Character attributes can include one or more of the following: character case, character combining class, character directionality, character numeric value, mathematical character, character language, letter character, alphabetic character and ideographic character. Other character attributes are possible.

A glyph can be associated with a set of glyph attributes defining appearance information for a representation of the corresponding character. Glyph attributes can include one or more of the following: glyph shape, glyph metrics, typeface name, glyph baseline and glyph kerning. Generally, glyph attributes provide the information necessary to render the glyph image.

A font is a collection of glyphs and a corresponding encoding mapping. A font is typically constructed to support a character set standard. That is, fonts include glyphs representing characters included in the character set standard. When the character set standard is revised, the font manufacturer may need to revise the font to accommodate the changes, including the addition of new glyphs. In that case, a new font is re-issued conforming to the new character set standard. Revising fonts is costly for the designer and inconvenient for users who must track versions of the font and determine whether or not they have fonts supporting the latest character set standard.

Text documents typically include a text string that includes one or more encoding values that represent characters in the text. An encoding value can map to a character in a character set standard and to a glyph in a font constructed to support the character set standard. Thus, a text engine (e.g., a word processing application) processing an electronic document that includes a text string of encoding values can obtain character attribute information about an encoded character represented by the encoding value by mapping the encoding value to the character set standard. The text engine can also render a representation of the character, that is, a glyph image, based on glyph attribute information obtained from a specified font, using the same encoding value. The encoding value-attribute associations are typically available for a text engine to reference by looking them up in fixed and static tables, indexed by encoding value. The attributes are not part of the document itself, but are usually built into the text engine or the operating system used by the application.

A character can be processed based on its character attributes and/or glyph attributes. For example, a layout engine that is setting text in vertical writing mode might handle numerals in a specialized way, or might handle a currency symbol differently than numerals in some contexts. As another example, attributes can be critical for input methods, as the user may need to choose the character based on the corresponding glyph's radical, stroke-count or pronunciation (e.g., a software agent used to assist selecting Chinese/Japanese characters). Thus, for a representation of a character (i.e., a glyph) to participate fully in an electronic document, the character and glyph attributes of the character and corresponding glyph must be accessible by a text engine processing the electronic document.

SUMMARY

The present invention provides methods and apparatus, including computer program products, for processing and constructing an electronic text document. In general, in one aspect, the invention features providing an electronic document including a string that includes one or more references and parsing the string to identify a reference. Based on the identified reference, a glyphlet is identified including a set of character attributes defining semantic information of a character and a set of glyph attributes defining appearance information for a representation of the character. One or more character attributes or glyph attributes for the identified glyphlet are used to process text in the electronic document.

Implementations of the invention can include one or more of the following. The string can include a plurality of references comprising one or more in-band values defined in an encoding standard. Parsing the string to identify a reference can include interpreting a plurality of in-band values to define the identified reference. Interpreting a plurality of in-band values to define the identified reference can include identifying one or more target attributes, and identifying a glyphlet based on the identified reference can include identifying a glyphlet in a collection of glyphlets based on the identified target attributes. The collection of glyphlets can be embedded within the electronic document or can be external to the electronic document.

Alternatively, the plurality of in-band values can define the identified glyphlet. In another alternative, the plurality of in-band values can identify a location external to the electronic document from which the identified glyphlet can be retrieved.

In another implementation, the string can include one or more references comprising one or more out-of-band values not defined in an encoding standard. The identified reference can include one or more of the out-of-band values. If the identified glyphlet is embedded within the electronic document, the one or more out-of-band values can be directly associated with the identified glyphlet. Identifying a glyphlet based on the identified reference can include identifying one or more target attributes based on the identified reference and identifying a glyphlet in a collection of glyphlets based on the identified target attributes. The collection of glyphlets can be embedded within the electronic document or external to the electronic document. The one or more out-of-band values can identify a location external to the electronic document from which the identified glyphlet can be retrieved.

The set of character attributes can include one or more character attributes selected from the group consisting of character case, character category, character combining class, character directionality, character numeric value, mathematical character, character language, letter character, alphabetic character and ideographic character. The set of glyph attributes can include one or more glyph attributes selected from the group consisting of glyph shape, typographic weight, typographic width, slant, number of strokes, glyph metrics, typeface name, glyph baseline and glyph kerning.

The identified glyphlet can be retrieved from a memory external to the electronic document, and can be retrieved from a collection of glyphlets. Alternatively, the identified glyphlet can be retrieved from storage embedded within the electronic document, including from a collection of glyphlets stored within the electronic document.

In general, in another aspect, the invention features method and apparatus for constructing a text document. User input is received selecting a character, and a glyphlet corresponding to the selected character is identified. The glyphlet includes a set of character attributes defining semantic information of the selected character and a set of glyph attributes defining appearance information for a glyph representative of the selected character. A reference to the identified glyphlet is inserted into a text document.

Implementations of the invention can include one or more of the following. The identified glyphlet can be embedded in the text document. The user input selecting a character can include user input selecting a glyph shape representing the character. The reference to the identified glyphlet can include one or more in-band values defined in an encoding standard. The one or more in-band values can define one or more target attributes uniquely identifying the identified glyphlet in a collection of glyphlets. Alternatively, the one or more in-band values can define the identified glyphlet.

The reference to the identified glyphlet can include one or more out-of-band values not defined in an encoding standard. The one or more out-of-band values can be associated with one or more target attributes uniquely identifying the identified glyphlet in a collection of glyphlets. Alternatively, if the identified glyphlet is embedded in the text document, the one or more out-of-band values can be directly associated with the identified glyphlet.

In general, in another aspect, the invention features method and apparatus for representing a character in a text document. A reference identifying a glyphlet is inserted into the text document. The identified glyphlet includes a set of character attributes defining semantic information of a character and a set of glyph attributes defining appearance information for a representation of the character.

Implementations of the invention can include one or more of the following. The identified glyphlet can be embedded in the text document. The reference can include one or more in-band values defined in an encoding standard that are interpreted to identify one or more target attributes from which the identified glyphlet can be identified. Alternatively, the reference can include one or more in-band values that are interpreted to define the identified glyphlet.

In another implementation, the reference can include one or more out-of-band values not defined in an encoding standard. The one or more out-of-band values can identify one or more target attributes, and the reference can identify the glyphlet from a collection of glyphlets based on the one or more target attributes. Alternatively, if the identified glyphlet is embedded in the text document, the one or more out-of-band values can be directly associated with the identified glyphlet.

The set of character attributes can include one or more character attributes selected from the group consisting of character case, character case, character combining class, character directionality, character numeric value, mathematical character, character language, letter character, alphabetic character and ideographic character. The set of glyph attributes can include one or more glyph attributes selected from the group consisting of glyph shape, typographic weight, typographic width, slant, number of strokes, glyph metrics, typeface name, glyph baseline, and glyph kerning.

In general, in another aspect, the invention features a glyphlet. A glyphlet is a data structure stored on a computer readable medium. The data structure includes character data representing one or more character attributes defining semantic information of a character and glyph data representing one or more glyph attributes defining appearance information for a representation of the character.

Implementations of the invention can include one or more of the following. The one or more character attributes can include one or more character attributes selected from the group consisting of character case, character category, character combining class, character directionality, character numeric value, mathematical character, character language, letter character, alphabetic character and ideographic character. The one or more glyph attributes can include one or more glyph attributes selected from the group consisting of glyph shape, typographic weight, typographic width, slant, number of strokes, glyph metrics, typeface name, glyph baseline, and glyph kerning.

In general, in another aspect, the invention features an electronic document stored on a computer readable medium. The electronic document includes electronic data defining a string that includes one or more references identifying glyphlets. A glyphlet includes a set of character data representing one or more character attributes defining semantic information of a character, and a set of glyph data representing one or more glyph attributes defining appearance information for a representation of the character.

Implementations of the invention can include one or more of the following. The electronic document can further include electronic data defining a collection of one or more glyphlets identified by the references in the string. A reference can include one or more in-band values defined in an encoding standard that are interpreted to identify one or more target attributes from which a glyphlet can be identified. Alternatively, a reference can include one or more in-band values that are interpreted to define a glyphlet.

In another implementation, a reference can include one or more out-of-band values not defined in an encoding standard. The one or more out-of-band values can identify one or more target attributes, and the reference can identify a glyphlet from a collection of glyphlets based on the one or more target attributes. The electronic data can define a collection of one or more glyphlets identified by the references in the string, and one or more out-of-band values can be directly associated with one or more glyphlets in the collection.

The set of character attributes can include one or more character attributes selected from the group consisting of character case, character category, character combining class, character directionality, character numeric value, mathematical character, character language, letter character, alphabetic character and ideographic character. The set of glyph attributes can include one or more glyph attributes selected from the group consisting of glyph shape, typographic weight, typographic width, slant, number of strokes, glyph metrics, typeface name, glyph baseline, and glyph kerning.

The invention can be implemented to realize one or more of the following advantages. Because a glyphlet (including glyph attributes and character attributes) can be identified based on a reference, a text engine can access glyph and character attribute information about the glyphlet without reliance on a specific encoding mapping. The text engine can process the glyphlet fully as any glyph included in an encoding mapping to a character set standard. Identifying a glyphlet based on a reference to a set of attributes adds a level of searchable access to glyphs beyond the traditional one-to-one encoding mapping. A target glyph can be stored external to a font. A font can be expandable by having access to additional glyph shapes when used in conjunction with a collection of one or more glyphlets, which glyphlets are accessible by a text engine processing a document that includes text in the font. The ability to use a collection of glyphlets in conjunction with a font can eliminate the need to create, distribute and install a revised font including additional glyphs, which is cost-effective, convenient and efficient to both font manufacturers and users.

The details of one or more embodiments of the invention are set forth in the accompanying drawings and the description below. Other features and advantages of the invention will be apparent from the description, the drawings, and the claims.

DESCRIPTION OF DRAWINGS

Like reference symbols in the various drawings indicate like elements.

DETAILED DESCRIPTION

A glyph that does not represent a character in a character set standard, or that does not have an encoding value in a font and is therefore not associated with a character in a character set standard, is sometimes referred to as a gaiji (a Japanese term meaning "foreign glyph"). Because the character set standard does not include a mapping from an encoding value to a set of character attributes for a gaiji, there are no character attributes associated with the gaiji. Currently, if a user wants to insert a gaiji into a document, a separate graphic image of the gaiji's glyph shape can be created and inserted into a gap in the layout of the text as displayed by a text-processing application. The display of the glyph shape gives the illusion that the gaiji is part of the text, but the text's underlying string itself does not include the gaiji or a reference to the gaiji. Further, the gaiji cannot participate in text-processing activities, for example, select, find/replace, spell-check and the like, as glyphs representing encoded characters can, because the text-processing application has no information about the character attributes associated with the gaiji. If the gaiji is not included in a font, the text-processing application may also have no information about the glyph attributes associated with the gaiji.

If character and glyph attributes are stored with a glyph, a text engine need not depend on any specific encoding to determine the character and glyph attributes associated with the glyph. Accordingly, such a glyph can participate fully as a glyph representing an encoded character, even though the glyph is not mapped to a set of glyph attributes by the font, and is not mapped to a set of character attributes in a character set standard.

A glyphlet is a set of glyph attributes and a set of character attributes. Glyph attributes define appearance information for a representation of a character, and can include: glyph shape, typographic weight, typographic width, slant, number of strokes, glyph metrics, typeface name, glyph baseline and glyph kerning. Character attributes define semantic information of a character, and can include: character case, character category, character combining class, character directionality, character numeric value, mathematical character, character language, letter character, alphabetic character and ideographic character. The glyph and character attribute lists above are not exhaustive and other attributes are possible.

A glyphlet provides a direct relationship between a representation of a character (i.e., a glyph) and the associated character attributes and glyph attributes. The character and glyph attributes can be accessed if the identity of the corresponding glyphlet is known. By contrast, a glyph included in a font is only indirectly related to a set of character attributes associated with the glyph. The character attributes are defined by the character set standard, as described above. The relationship between a glyph in a font and a set of character attributes in a character set standard is therefore formed through the encoding mapping of the character set standard and the font. Aside from this relationship, the glyph and set of character attributes are independent of one another. If the relationship does not exist, for example, if a font includes a glyph that does not have a corresponding mapping in the character set standard used to construct the font, then a text engine cannot access character attribute information for the glyph. Without accessible character attributes, the glyph cannot participate fully as a character within a text document.

A glyphlet can be implemented as a data structure storing character attributes and glyph attributes, or surrogates for them, e.g., pointers or indices. In one implementation, a glyphlet is packaged as a "sfnt" (Open Type) structured font, including at least two tables: one for the glyph shape and one for the metadata including the character and glyph attributes. The metadata table is an indexed list of attribute key-value entries. The glyphlet can be queried for an attribute by searching the metadata list for entries whose key matches the desired attribute. The glyphlet's metadata can also be prefetched and cached in a database, which can be queried more efficiently than inspecting each glyphlet's sfnt structure directly.

A glyphlet included in a text document can be represented by a "reference" included in a text string: a text string can include references in addition to encoding values representing encoded characters. Processing an electronic document including a glyphlet can be implemented using a text engine configured to recognize a reference from which a glyphlet can be identified, and to interpret the reference to identify the glyphlet, as described further below.

A reference from which a glyphlet can be identified can be an out-of-band value not defined in an encoding standard. For example, a reference can be an integer value recognizable by a text engine as referring to a glyphlet that is not included in an encoding mapping. The out-of-band value can be directly associated with a glyphlet embedded within the electronic document. Alternatively, the out-of-band value can be associated with information indicating where a glyphlet can be found external to the text document, for example, an address to a server from which the glyphlet can be downloaded.

In another alternative, the out-of-band value can be associated with one or more target attributes, embedded within the electronic document, that uniquely identify a glyphlet. The target attributes can form the basis of a query used to query a collection of glyphlets, from which the glyphlet can be identified. The collection of glyphlets can be embedded within the document, or information can be embedded in the document indicating an external store where the collection of glyphlets can be found.

In any event, the reference is selected to be recognizable by an appropriately configured text engine as a reference from which a glyphlet can be identified, such that the text engine must look somewhere other than a character set standard for attribute information necessary to process the glyphlet. For example, an integer or range of integers can be set aside for use as references only, such that a text engine processing a string including encoding values included in an encoding standard and references, will recognize an integer within the range as a reference and identify a glyphlet accordingly.

In another implementation, the reference can be one or more in-band values defined in an encoding standard. The in-band values can define a glyphlet, that is, include the glyph attributes and character attributes. Alternatively, the in-band values can identify where a glyphlet can be found external to the text document, for example, an address to a server from which the glyphlet can be downloaded.

In another alternative, the in-band values can define one or more target attributes that can be used to identify the glyphlet. The target attributes defined by the in-band value can be used to form a query. Using the query, the glyphlet can be identified from a collection of glyphlets: the glyphlet including one or more attributes satisfying the query. As discussed above, the collection of glyphlets can be embedded in the text document, or can be found in an external store identified by information embedded in the text document.

Figure 1:
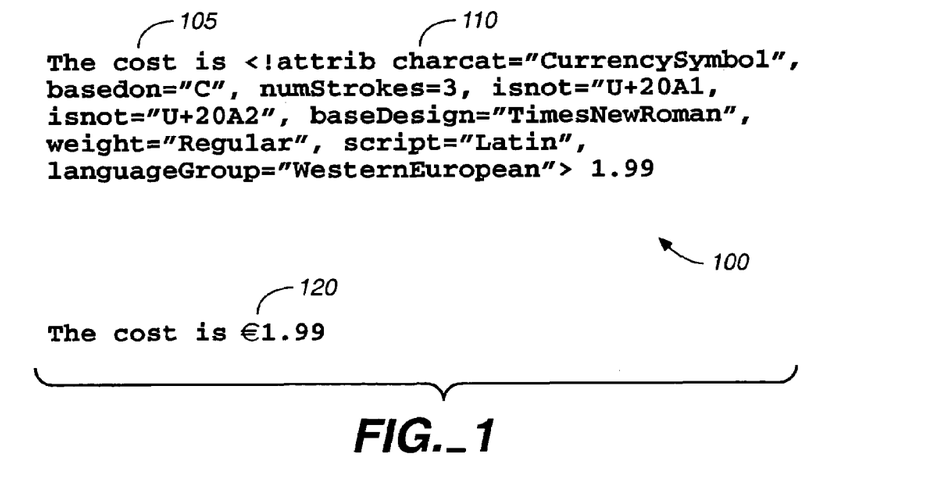
FIG. 1 represents a text string including an in-band value reference and multiple encoded characters.

In-band values can include, for example, an XML string including one or more tagged elements. The tagged elements can be attribute-value pairs defining target attributes. FIG. 1 shows a representation of a text string 100 including several encoded characters 105 and an in-band reference 110 from which a glyphlet can be identified. In a text document, the text string 100 would be formed of encoding values, for example, ASCII values associated with each of the encoded characters 105 and the encoded characters included in the in-band value reference 110. For illustrative purposes, the representative characters are shown in FIG. 1.

In this example, the reference 110 includes attribute information from which a glyphlet can be identified. For example, the character category (charcat) attribute has the value "Currency Symbol". As described above, the attributes defined by the reference 110 can be used to form a query. A collection of glyphlets can be queried and a glyphlet having one or more attributes satisfying the query can be identified. A glyph shape representing the character having the attributes defined in the reference 110 can be rendered using glyph attribute information accessible from the identified glyphlet. In this example, the glyph shape for the Euro symbol, €120, can be rendered and displayed by a display device, such as a monitor or printer, along with glyph shapes representing the encoded characters 105 included in the text string 100.

One or more glyphlets can be included in a cache included within a text document, and, as discussed above, a reference can be a pointer or offset to a glyphlet within the cache. Alternatively, a reference can be a pointer to a location in memory storing the glyphlet.

Figure 2:
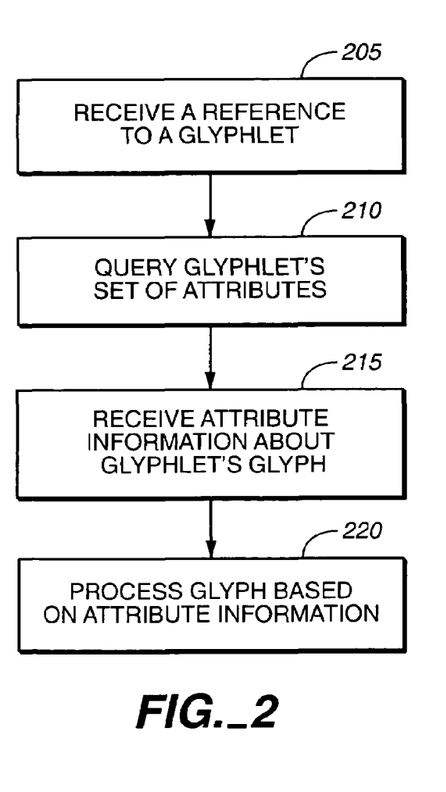
FIG. 2 is a flowchart showing a process for processing text that includes a reference to a glyphlet.

FIG. 2 shows a process for retrieving attribute information from a glyphlet, for example, using a text engine processing a text document. As discussed above, strings within the text document include both encoding values associated with encoded characters, and references associated with glyphlets. In the first step, a reference is encountered in a string and recognized as a reference from which a glyphlet can be identified (Step 205). The recognition occurs because, for example, the reference is an out-of-band value integer within a range of integers reserved for references, or because the reference is one or more in-band values defining target attributes of a glyphlet. If the text engine requires character or glyph attribute information for the glyphlet, then the text engine queries the glyphlet (Step 210). Attribute information is retrieved from the glyphlet in response to the query (Step 215). For example, a text engine might be tasked to build a concordance for a text document, which requires a count of words within the document. In order to identify a word formed by a string, the text engine may need to retrieve character attribute information for a glyphlet represented by a reference included in the string. For example, the text engine may need to determine the pronunciation of the glyphlet, in order to identify the word. The string including the glyphlet can then be processed based on the retrieved attribute information (Step 220).

Figure 3:
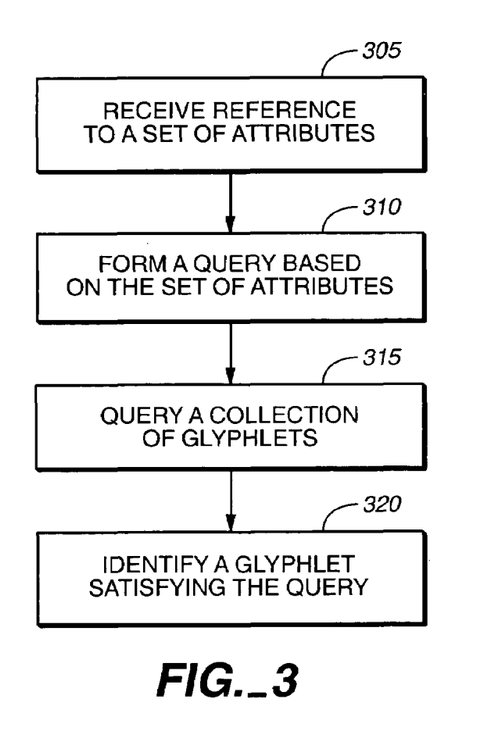
FIG. 3 is a flowchart showing a process for identifying a glyphlet based on a reference to a set of attributes.

As discussed above, a reference can be used to identify one or more target attributes, from which a target glyphlet can be identified. FIG. 3 shows a process for identifying a glyphlet based on a reference to a set of attributes. For illustrative purposes, consider a text engine processing a text document. The text engine receives a reference, which can be included in a string among encoding values associated with encoded characters, and recognizes the reference as referring to a set of attributes (Step 305). As discussed above, the reference can be recognizable as referring to a set of attributes because, for example, the reference is an integer within a range of integer values reserved for references. Alternatively, the reference can specify attributes, for example, the reference can be a tagged XML string (included in the text string) specifying a set of attributes. To identify a glyphlet associated with the reference, the text engine generates a query based on the set of attributes identified by the reference (310).

A collection of one or more glyphlets is then queried, to identify a glyphlet including one or more attributes satisfying the query (315). It is possible that two or more glyphlets satisfy a query, in which case user can be presented a visual representation of the glyphlets and prompted to make a choice. Alternatively, it is possible that no glyphlet satisifies a query. In this case, the text engine can be configured to alert the user that no corresponding glyphlet is available, e.g., by displaying an error message or, if appropriate, inserting a default glyph at the relevant location in the text. The collection of glyphlets can be a cache of glyphlets included in the text document, or can be stored in memory, separate from the text document. A glyphlet including one or more attributes satisfying the query is identified (Step 320). The text engine can then access information from the glyphlet to render the glyph (i.e., glyph attributes) or otherwise process the glyphlet (i.e., character attributes).

The independence of a glyphlet from a character set standard or a font allows new characters to be introduced into a text processing application with relative ease. By way of illustrative example, consider the introduction of a common currency in Europe, which required a new typographic symbol to represent the new common European currency, the "Euro". Most existing character set standards and fonts did not include the symbol €representing the Euro. Character set standards were eventually changed and new fonts, conforming with the revised character set standards, were developed and distributed.

Another approach to the introduction of the new Euro symbol would have been to distribute a glyphlet representing the €symbol, including glyph attributes and character attributes. The glyphlet can be stored by an operating system. In one implementation, a text engine can build a menu or palette indicating characters available for use in a text document from a collection of one or more such glyphlets stored by the operating system. The text engine can query the glyphlets and generate corresponding menu items, which a user can use to select the indicated character. The character may be indicated by a graphic representation, i.e., a glyph shape rendered based on glyph attribute information obtained from the corresponding glyphlet, or by one or more character attributes unique to the glyphlet, such as the character name. By selecting a menu item, a user can insert a reference to a glyphlet corresponding to the character indicated by the menu item into a text document.

In another implementation, a menu item can be associated with one or more character attributes, rather than associated with a glyphlet. If the menu item is selected, then based on the one or more associated character attributes, the text engine can generate a query and query a collection of one or more glyphlets, which can be stored by the operating system. If a match is found, that is, a glyphlet including one or more character attributes satisfying the query, then the glyphlet can be used to render a glyph shape or otherwise process the glyphlet.

Figure 4:
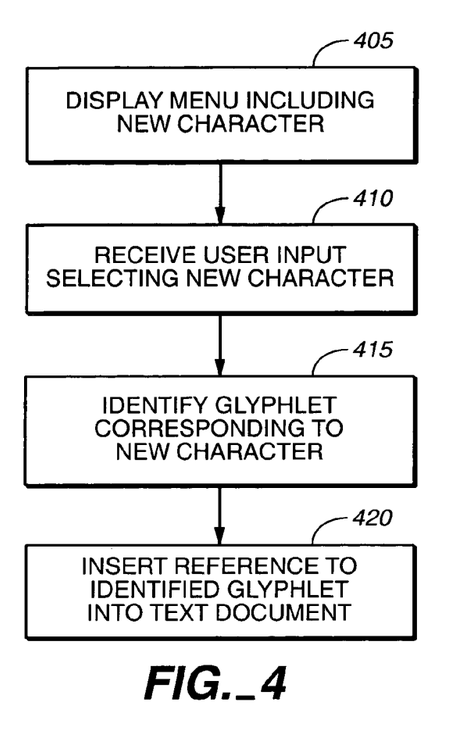
FIG. 4 is a flowchart showing a process for constructing a text document including a glyphlet.

To illustrate the above, consider the Euro example. FIG. 4 shows a process for constructing a text document included a reference to a glyphlet. In this example, the word processing application has a menu of characters, which includes a representation of the Euro symbol, such as a graphic image of the symbol, the name of the symbol, i.e. Euro, or some other attribute clearly identifying the Euro (Step 405). User input is received selecting the Euro, for example, by highlighting and clicking on the menu item representing the Euro (Step 410).

A glyphlet corresponding to the selected character is then identified (Step 415). For example, the menu item can be associated with a pointer that can be followed to a memory location where the glyphlet is stored. Alternatively, the one or more target attributes can be stored at the memory location, from which a query can be formed. The query can be used to query a collection of glyphlets to identify a target glyphlet having one or more attributes satisfying the query.

Once a glyphlet is identified, a reference to the identified glyphlet is inserted into the text document (Step 420). As discussed above, the reference can be an out-of-band value or one or more in-band values. A glyph shape rendered from the glyph attributes included in the target glyphlet can be displayed in a display of the text document, for example, on a monitor or by a printer. The reference can be subsequently used by a text engine processing the text document to identify the target glyphlet.

A recipient of the text document processing the text document using a different text engine and a different computer may find a reference in the text document meaningless, particularly if the recipient's text engine does not have access to the glyphlet. To avoid this situation, the glyphlet can be embedded within the text document and thus accessible to a recipient of the text document. In another implementation, the reference can provide a text engine processing the document information about where to obtain a corresponding glyphlet, for example, an address where the glyphlet can be retrieved from a server.

As discussed above, if a character set standard is revised, then a font constructed under a previous version of the character set standard may be outdated and considered incomplete and non-conformant. To bring a font into conformance with the revised character set standard requires revisions to the font, and distribution and installation of a new font to users of the existing font. By using one or more glyphlets, the glyph shapes accessible by a font can be expanded without requiring a revised font to be distributed and installed by font users.

One approach to expanding the glyph shapes accessible by a font is to provide font users with a collection of one or more glyphlets corresponding to changes made to the underlying character set standard. For example, when a new character is added to the character set standard, rather than distribute a revised font that includes a glyph image for the new character and shares an encoding value mapping to the corresponding new character's attributes in the character set standard, a new glyphlet for the new character is distributed to font users that can be used in conjunction with the existing font. The new glyphlet includes glyph attributes for rendering a glyph shape representing the new character, with any stylistic features necessary to conform to the font typeface. The new glyphlet also includes character attributes corresponding to the new character. The character attributes mirror those included in the revised character set standard corresponding to the new character, but are accessible by querying the new glyphlet, rather than by an encoding value mapping to the character set standard. Thus, the font in conjunction with the new glyphlet performs just as if a revised font including a glyph image for the new character and a corresponding mapping to the new character in the character set standard were being used. In this manner, additional glyph shapes can easily, quickly and inexpensively be accessible without necessitating issuance of a revised form of the font.

Another approach to expanding the glyph shapes accessible by a font using a glyphlet is to include a mapping to one or more references in a font. The one or more references can be used to identify one or more glyphlets. As discussed above, the reference can be uniquely associated with a glyphlet, or can identify one or more target attributes that can be used to identify a target glyphlet.

By way of illustrative example, consider the introduction of the new typographic symbol to represent the "Euro", discussed above. Before the symbol €became representative of the Euro, it was known that a new common currency would be established, and that a new symbol would likely be necessary to represent the currency. Accordingly, there was a time period during which font manufacturers released fonts knowing that they would soon be rendered out-dated by the introduction of the new currency symbol. A character set standard from which a font was constructed may have been revised to include an encoding value and character attributes for the Euro, although the representation of the Euro symbol had not yet been determined. One solution would have been to include a mapping in the font from the Euro encoding value to a reference to a set of attributes, which attributes could later be used to form a query from which a Euro glyphlet could be identified. For example, the set of attributes could include the "currency symbol" attribute. Later, once the symbol had been determined, the font manufacturer could provide a new glyphlet, including an appropriate set of glyph attributes and character attributes, for example, a name attribute having the value "Euro" and a "currency symbol" attribute.

Figure 5:
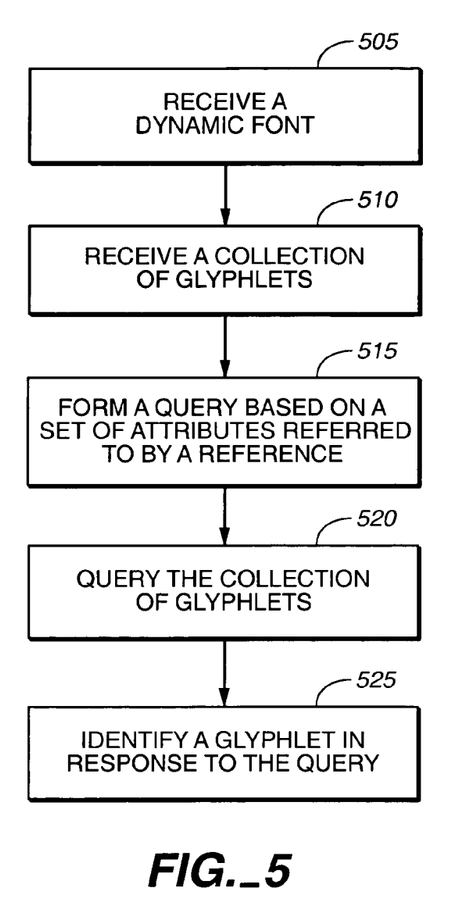
FIG. 5 is a flowchart showing a process for identifying a glyph referenced by a dynamic font.

FIG. 5 shows a process for expanding the glyph shapes accessible by a "dynamic" font. Using the above illustrative example, the first step includes receiving a dynamic font, that is a font that includes a mapping to a reference that can be used to identify a glyphlet having a "currency symbol" attribute (Step 505). The font does not include an encoding value mapped to a glyph within the font for the €symbol, because the font was released before it was known that the €symbol would represent the Euro.

Once it is known the €symbol represents the Euro, the font manufacturer creates a glyphlet representing the Euro character, including a set of glyph attributes and character attributes. The Euro glyphlet is provided to users of the font and installed (e.g. stored in memory), rather than requiring installation of a new font altogether (Step 510). A user can then create a text document including the €symbol, for example, by choosing the symbol from a drop down menu on a text processing application as described above. The application inserts in the text document the reference to a set of one or more attributes, such as the "currency symbol" attribute, from which the Euro glyphlet can be identified.

A text engine processing a text document including the €symbol encounters the reference and recognizes the reference as referring to a set of attributes from which a glyphlet can be identified. The text engine then generates a query based on the set of attributes (Step 515). A cache or collection of glyphlets is queried (Step 520). The text engine identifies the Euro glyphlet from the collection of glyphlets as having attributes satisfying (i.e., matching to some degree) the query (Step 525). The text engine can then render the glyph shape, in this example the €symbol, or otherwise process the glyphlet as if a glyph had been included in the font's encoding and mapped to the underlying character set standard.

In one implementation, a font can be formed entirely of a mapping to references from which glyphlets can be identified, as described above in the context of the Euro symbol example. By using the font in conjunction with a collection of one or more glyphlets, glyphlets referenced by the font can be accessed to render glyph shapes or otherwise process the glyphlets based on the glyphlet's character and glyph attributes.

The first time a text engine encounters a reference and identifies a glyphlet based on the reference, the text engine can store an identifier for the glyphlet associated with the reference. The next time the reference is encountered, text engine can identify the glyphlet based on the stored identifier, without having to perform another query. For example, if the glyphlet includes a name, the text engine can associate the name of the glyphlet with the reference. The next time the reference is encountered, the text engine can use the glyphlet's name to access the glyphlet without requiring a second query.

To summarize the above in the context of a font-rendering system, consider a font-rendering system tasked to render a desired glyph shape from a font. If the font includes a mapping to a glyph definition, the system displays a glyph image. If the font includes a mapping to a reference from which a glyphlet can be identified, the system identifies the glyphlet based on the reference and displays a glyph image. The reference can be associated with either a glyphlet or a set of attributes from which a glyphlet can be identified, or can include the glyphlet, as discussed above. If the reference identifies a set of attributes, the system can form a query based on the attributes, and search a store of glyphlets to find a glyphlet having attributes best matching the query. The system can task an external mechanism to perform the search. The external mechanism returns to the system a glyphlet that includes attributes satisfying the query. The system can cache the glyphlet in memory and display the glyph image, or otherwise process the glyphlet based on the glyph and/or character attributes.

In one implementation, a typeface can be formed entirely of glyphlets. A glyphlet-based typeface does not include any encoding values mapped to glyphs in a font and characters in a character set standard. Rather, the typeface is formed from a collection of one or more glyphlets that can be identified by a reference included in a text document, as described above. The reference can be directly associated with a glyphlet, or can be associated with one or more target attributes from which a glyphlet can be identified. Such a font can be useful for glyphs that are likely to change often.

The invention can implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer-implemented method to process text in an electronic document including text defined by a string that includes one or more references, each reference representing a character in the text, the method comprising:

performing operations by a programmable processor of a computer, the operations comprising:

parsing the string to identify a reference, the reference representing a first character in the text;

based on the identified reference, identifying a glyphlet embedded in the electronic document and stored with the electronic document in a memory of the computer, the glyphlet being a data structure including both a set of one or more character attributes defining semantic information of the first character and a set of one or more glyph attributes defining appearance information from which a glyph image of a glyph representing the first character can be rendered, the glyph attributes including all the information necessary to render the glyph image; and using one or more character attributes or glyph attributes for the identified glyphlet to process text in the electronic document, including using the set of character attributes of the glyphlet to process semantic information of the first character or using the set of glyph attributes of the glyphlet to process appearance information for a representation of the first character.

2. The method of claim 1, wherein:
the string includes a plurality of references comprising one or more in-band values defined in an encoding standard.

3. The method of claim 2, wherein:
parsing the string to identify a reference includes interpreting a plurality of in-band values to define the identified reference.

4. The method of claim 3, wherein:
interpreting a plurality of in-band values to define the identified reference includes identifying one or more target attributes; and
identifying a glyphlet based on the identified reference includes identifying a glyphlet in a collection of glyphlets based on the identified target attributes.

5. The method of claim 4, wherein:
the collection of glyphlets is embedded within the electronic document.

6. The method of claim 3, wherein:
the plurality of in-band values define the identified glyphlet.

7. The method of claim 1, wherein:
the string includes one or more references comprising one or more out-of-band values not defined in an encoding standard.

8. The method of claim 7, wherein:
the identified reference includes one or more of the out-of-band values.

9. The method of claim 8, wherein:
the one or more out-of-band values are directly associated with the identified glyphlet.

10. The method of claim 8, wherein:
identifying a glyphlet based on the identified reference includes identifying one or more target attributes based on the identified reference and identifying a glyphlet in a collection of glyphlets based on the identified target attributes.

11. The method of claim 10, wherein:
the collection of glyphlets is embedded within the electronic document.

12. The method of claim 1, wherein:
the set of character attributes includes one or more character attributes selected from the group consisting of character case, character category, character combining class, character directionality, character numeric value, mathematical character, character language, letter character, alphabetic character and ideographic character.

13. The method of claim 1, further comprising:
retrieving the identified glyphlet from storage embedded within the electronic document.

14. The method of claim 13, wherein:
the identified glyphlet is retrieved from a collection of glyphlets.

15. The method of claim 1, wherein using one or more character attributes or glyph attributes for the identified glyphlet to process text in the electronic document comprises:
using the semantic information defined by the one or more character attributes to perform a find and replace text processing operation on the electronic document, where at least one string included in the electronic document is replaced with a modified string.

16. The method of claim 1, wherein using one or more character attributes or glyph attributes for the identified glyphlet to process text in the electronic document comprises:
using the semantic information defined by the one or more character attributes to perform a spell-check text processing operation on the electronic document, where at least one string included in the electronic document is replaced with a modified string.

17. A computer-implemented method for constructing a text document, the method comprising:
performing operations by a programmable processor of a first computer, comprising:
receiving user input at the first computer selecting a character for insertion into a text document;
identifying in a memory of the first computer a glyphlet representing the selected character, the glyphlet being a data structure including both a set of one or more character attributes defining semantic information of the selected character and a set of one or more glyph attributes defining appearance information for a glyph representative of the selected character, the glyph attributes including all the information necessary to render a glyph image of the glyph;
inserting the character into the text document by inserting a reference to the identified glyphlet into the text document, where the reference can be used to access the sets of character and glyph attributes from the glyphlet for the character selected by the user input; and
displaying the character in the text document, the displayed character being rendered from the glyph attributes.

18. The method of claim 17, wherein:
user input selecting a character includes user input selecting a glyph shape representing the character.

19. The method of claim 17, wherein:
the reference to the identified glyphlet includes one or more in-band values defined in an encoding standard.

20. The method of claim 19, wherein:
the one or more in-band values define one or more target attributes uniquely identifying the identified glyphlet in a collection of glyphlets.

21. The method of claim 19, wherein:
the one or more in-band values define the identified glyphlet.

22. The method of claim 17, wherein:
the reference to the identified glyphlet includes one or more out-of-band values not defined in an encoding standard.

23. The method of claim 22, wherein:
the one or more out-of band values are associated with one or more target attributes uniquely identifying the identified glyphlet in a collection of glyphlets.

24. The method of claim 22, further comprising:
embedding the identified glyphlet in the text document;
wherein the one or more out-of-band values are directly associated with the identified glyphlet.

25. The method of claim 17, further comprising:
embedding the identified glyphlet in the text document.

26. A computer-implemented method of representing a character in a text document, comprising:
performing operations by a programmable processor of a computer, comprising:
inserting into the text document a reference identifying a glyphlet, the identified glyphlet stored in a memory of the computer being a data structure including both a set of one or more character attributes defining semantic information of a character and a set of one or more glyph attributes defining appearance information from which a glyph image of a glyph representing the character can be rendered, the glyph attributes including all the information necessary to render the glyph image, the reference representing the character in the text document; and
displaying the character in the text document, the displayed character being rendered from the glyph attributes.

27. The method of claim 26, further comprising:
embedding the identified glyphlet in the text document.

28. The method of claim 26, wherein:
the reference includes one or more in-band values defined in an encoding standard that are interpreted to identify one or more target attributes from which the identified glyphlet can be identified.

29. The method of claim 26, wherein:
the reference includes one or more in-band values that are interpreted to define the identified glyphlet.

30. The method of claim 26, wherein:
the reference includes one or more out-of-band values not defined in an encoding standard.

31. The method of claim 30, wherein:
the one or more out-of-band values identify one or more target attributes; and
the reference identifies the glyphlet from a collection of glyphlets based on the one or more target attributes.

32. The method of claim 30, further comprising:
embedding the glyphlet in the text document;
wherein, the one or more out-of-band values are uniquely associated with the identified glyphlet.

33. The method of claim 26, wherein:
the set of one or more character attributes includes one or more character attributes selected from the group consisting of character case, character category, character combining class, character directionality, character numeric value, mathematical character, character language, letter character, alphabetic character and ideographic character.

34. A memory for access by a text-processing application being executed on a computer and an electronic document including a data structure embedded in the electronic document stored in said memory, the electronic document including the data structure comprising:
electronic data comprising text defined by a string that includes one or more references each reference identifying a glyphlet and each reference representing a character in the text, where a glyphlet identified by a reference is the data structure embedded in the electronic document and includes both a set of character data representing a set of one or more character attributes defining semantic information of a character represented by the reference and a set of glyph data representing a set of one or more glyph attributes defining appearance information for a visual representation of the character and where a visual appearance of the character can be derived from the glyphlet identified by the reference and displayed to a user.

35. The memory of claim 34, wherein the electronic document further comprises:
electronic data defining a collection of one or more glyphlets identified by the references in the string.

36. The memory of claim 34, wherein:
the reference includes one or more in-band values defined in an encoding standard that are interpreted to identify one or more target attributes from which a glyphlet can be identified.

37. The electronic document of claim 34, wherein:
the reference includes one or more in-band values that are interpreted to define a glyphlet.

38. The computer readable medium encoded with the electronic document of claim 34, wherein:
the reference includes one or more out-of-band values not defined in an encoding standard.

39. The memory of claim 38, wherein:
the one or more out-of-band values identify one or more target attributes; and
the reference identifies a glyphlet from a collection of glyphlets based on the one or more target attributes.

40. The memory of claim 38, wherein the electronic document including the data structure further comprises:
electronic data defining a collection of one or more glyphlets identified by the references in the string;
wherein the one or more out-of-band values are directly associated with one or more glyphlets in the collection of glyphlets.

41. The memory of claim 34, wherein:
the set of one or more character attributes includes one or more character attributes selected from the group consisting of character case, character category, character combining class, character directionality, character numeric value, mathematical character, character language, letter character, alphabetic character and ideographic character.

42. A computer readable medium encoded with a computer program the computer program comprising instructions that when executed by a programmable processor of a computer cause the programmable processor to perform operations comprising:
obtaining an electronic document in a memory of the computer, the electronic document including text defined by a string that includes one or more references, each reference representing a character in the text;
parsing the string in the memory to identify a reference, the reference representing a first character in the text;
based on the identified reference, identifying a glyphlet, the glyphlet being a data structure embedded in the electronic document and stored with the electronic document in the memory including both a set of one or more character attributes defining semantic information of the first character and a set of one or more glyph attributes defining appearance information from which a glyph image of a glyph representing the first character can be rendered, the glyph attributes including all the information necessary to render the glyph image; and
using one or more character attributes or glyph attributes for the identified glyphlet to process text in the electronic document, including instructions operable to cause a programmable processor to use the set of character attributes of the glyphlet to process semantic information of the first character and instructions operable to cause a programmable processor to use the set of glyph attributes of the glyphlet to process appearance information for a visual representation of the first character.

43. The computer readable medium encoded with the computer program of claim 42, wherein:

the string includes a plurality of references comprising one or more in-band values defined in an encoding standard.

44. The computer readable medium encoded with the computer program of claim 43, wherein:

parsing the string to identify a reference includes interpreting a plurality of in-band values to define the identified reference.

45. The computer readable medium encoded with the computer program of claim 44, wherein:

interpreting a plurality of in-band values to define the identified reference includes identifying one or more target attributes; and identifying a glyphlet based on the identified reference includes identifying a glyphlet in a collection of glyphlets based on the identified target attributes.

46. The computer readable medium encoded with the computer program of claim 44, wherein:

the plurality of in-band values define the identified glyphlet.

47. The computer readable medium encoded with the computer program of claim 42, wherein:

the string includes one or more references comprising one or more out-of-band values not defined in an encoding standard.

48. The computer readable medium encoded with the computer program of claim 47, wherein:

the identified reference includes one or more of the out-of-band values.

49. The computer readable medium encoded with the computer program of claim 47, wherein:

the one or more out-of-band values are directly associated with the identified glyphlet.

50. The computer readable medium encoded with the computer program of claim 47, wherein:

identifying a glyphlet based on the identified reference includes identifying one or more target attributes based on the identified reference and identifying a glyphlet in a collection of glyphlets based on the identified target attributes.

51. The computer readable medium encoded with the computer program of claim 46, wherein:

the set of one or more character attributes includes one or more character attributes selected from the group consisting of character case, character category, character combining class, character directionality, character numeric value, mathematical character, character language, letter character, alphabetic character and ideographic character.

52. The computer readable medium encoded with the computer program of claim 42, the computer program further comprising instructions that when executed by the programmable processor cause the programmable processor to perform operations comprising:

retrieving the identified glyphlet from storage embedded within the electronic document.

53. The readable medium encoded with the computer program of claim 52, wherein:

the identified glyphlet is retrieved from a collection of glyphlets.

54. The computer readable medium encoded with the computer program of claim 42, wherein using one or more character attributes or glyph attributes for the identified glyphlet to process text in the electronic document comprises:

using the semantic information defined by the one or more character attributes to perform a find and replace text processing operation on the electronic document, where at least one string included in the electronic document is replaced with a modified string.

55. The computer readable medium encoded with the computer program of claim 42, wherein using one or more character attributes or glyph attributes for the identified glyphlet to process text in the electronic document comprises:

using the semantic information defined by the one or more character attributes to perform a spell-check text processing operation on the electronic document, where at least one string included in the electronic document is replaced with a modified string.

56. A computer readable medium encoded with a computer program for constructing a text document, the computer program comprising instructions that when executed by a programmable processor of a computer cause the programmable processor to perform operations comprising:

receiving user input at the computer selecting a character for insertion into a text document;

identifying in a memory of the computer a glyphlet representing the selected character, the glyphlet being a data structure including both a set of one or more character attributes defining semantic information of the selected character and a set of one or more glyph attributes defining appearance information for a glyph representative of the selected character, the glyph attributes including all the information necessary to render a glyph image of the glyph;

inserting the character into the text document by inserting a reference to the identified glyphlet into a text document, where the reference can be used to access the sets of character and glyph attributes from the glyphlet for the character selected by the user input; and displaying the character in the text document, the displayed character being rendered from the glyph attributes.

57. The computer readable medium encoded with the computer program of claim 56, wherein:

user input selecting a character includes user input selecting a glyph shape representing the character.

58. The computer readable medium encoded with the computer program of claim 56, wherein:

the reference to the identified glyphlet includes one or more in-band values defined in an encoding standard.

59. The computer readable medium encoded with the computer program of claim 58, wherein:

the one or more in-band values define one or more target attributes uniquely identifying the identified glyphlet in a collection of glyphlets.

60. The computer readable medium encoded with the computer program of claim 58, wherein:

the one or more in-band values define the identified glyphlet.

61. The computer readable medium encoded with the computer program of claim 56, wherein:

the reference to the identified glyphlet includes one or more out-of-band values not defined in an encoding standard.

62. The computer readable medium encoded with the computer program of claim 61, wherein:

the one or more out-of-band values are associated with one or more target attributes uniquely identifying the identified glyphlet in a collection of glyphlets.

63. The computer readable medium encoded with the computer program of claim 61, the computer program further comprising instructions that when executed by the programmable processor cause the programmable processor to perform operations comprising:

embedding the identified glyphlet in the text document;

wherein the one or more out-of-band values are directly associated with the identified glyphlet.

64. The computer readable medium encoded with the computer program of claim 56, the computer program further comprising instructions that when executed by the programmable processor cause the programmable processor to perform operations comprising:

embedding the identified glyphlet in the text document.

65. A computer readable medium encoded with a computer program for representing a character in a text document, the computer program comprising instructions that when executed by a programmable processor of a computer cause the programmable processor to perform operations comprising:

inserting into the text document a reference identifying a glyphlet, the identified glyphlet being a data structure stored in a memory of the computer including both a set of one or more character attributes defining semantic information of a character and a set of one or more glyph attributes defining appearance information from which a glyph image of a glyph representing the character can be rendered, the glyph attributes including all the information necessary to render the glyph image, the reference representing the character in the text document; and displaying the character in the text document, the displayed character being rendered from the glyph attributes.

66. The computer readable medium encoded with the computer program of claim 65, the computer program further comprising instructions that when executed by the programmable processor cause the programmable processor to perform operations comprising:

embedding the identified glyphlet in the text document.

67. The computer readable medium encoded with the computer program of claim 65, wherein:

the reference includes one or more in-band values defined in an encoding standard that are interpreted to identify one or more target attributes from which the identified glyphlet can be identified.

68. The computer readable medium encoded with the computer program of claim 65, wherein:

the reference includes one or more in-band values that are interpreted to define the identified glyphlet.

69. The computer readable medium encoded with the computer program of claim 65, wherein:

the reference includes one or more out-of-band values not defined in an encoding standard.

70. The computer readable medium encoded with the computer program of claim 69, wherein:

the one or more out-of-band values identify one or more target attributes; and the reference identifies the glyphlet from a collection of glyphlets based on the one or more target attributes.

71. The computer readable medium encoded with the computer program of claim 69, the computer program further comprising instructions that when executed by the programmable processor cause the programmable processor to perform operations comprising:

embedding the identified glyphlet in the text document;

wherein the one or more out-of-band values are uniquely associated with the identified glyphlet.

72. The computer readable medium encoded with the computer program of claim 65, wherein:

the set of one or more character attributes includes one or more character attributes selected from the group consisting of character case, character category, character combining class, character directionality, character numeric value, mathematical character, character language, letter character, alphabetic character and ideographic character.

* * * * *

UNITED STATES PATENT AND TRADEMARK OFFICE
CERTIFICATE OF CORRECTION

PATENT NO. : 7,639,257 B2 Page 1 of 1
APPLICATION NO. : 10/210512
DATED : December 29, 2009
INVENTOR(S) : John S. Renner It is certified that error appears in the above-identified patent and that said Letters Patent is hereby corrected as shown below:

Title Page; item (56);
First page, column 2, under OTHER PUBLICATIONS, line 6, delete "Disclousre" and insert --Disclosure--.

First page, column 2, under OTHER PUBLICATIONS, line 9, delete "Disclousre" and insert --Disclosure--.

Column 14, line 65, claim 23, delete "of band" and insert --of-band--.

Column 16, line 16, claim 37, delete "electronic document" and insert --memory--.

Column 16, line 19, claim 38, delete "The computer readable medium encoded with the electronic document of claim 34, wherein:
    the reference includes one or more out-of-band values not defined in an encoding standard." and insert --The memory of claim 34, wherein: the reference includes one or more out-of-band values not defined in an encoding standard.--.

Column 17, line 37, claim 49, delete "47," and insert --48--.

Column 17, line 41, claim 50, delete "47," and insert --48--.

Column 17, line 49, claim 51, delete "46," and insert --42--.

Column 17, line 64, claim 53, after "The" insert --computer--.

Column 19, line 22, claim 65, delete "representing a character in" and insert --constructing--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,639,257 B2  Page 1 of 1
APPLICATION NO. : 10/210512
DATED : December 29, 2009
INVENTOR(S) : Kpjm S. Renner It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 659 days.

Signed and Sealed this

Twenty-second Day of June, 2010

David J. Kappos
*Director of the United States Patent and Trademark Office*